United States Patent
Khan

(10) Patent No.: US 8,049,470 B2
(45) Date of Patent: Nov. 1, 2011

(54) APPARATUS AND METHOD FOR CHARGING SUPER CAPACITORS AT LIMITED VOLTAGE AND/OR CURRENT VALUES IRRESPECTIVE OF TEMPERATURE

(75) Inventor: Zafarullah Khan, Kenner, LA (US)

(73) Assignee: SmartSynch, Inc., Jackson, MS (US)

( * ) Notice: Subject to any disclaimer, the term of this patent is extended or adjusted under 35 U.S.C. 154(b) by 641 days.

(21) Appl. No.: 12/122,935

(22) Filed: May 19, 2008

(65) Prior Publication Data
US 2008/0303488 A1    Dec. 11, 2008

Related U.S. Application Data

(60) Provisional application No. 60/943,135, filed on Jun. 11, 2007.

(51) Int. Cl.
*H02J 7/00* (2006.01)
(52) U.S. Cl. ........................ 320/167; 320/153
(58) Field of Classification Search .............. 320/167
See application file for complete search history.

(56) References Cited

U.S. PATENT DOCUMENTS

| | | | |
|---|---|---|---|
| 6,833,983 B2 | 12/2004 | Nguyen et al. | |
| 6,947,855 B2 | 9/2005 | Verbrugge et al. | |
| 2001/0033501 A1* | 10/2001 | Nebrigic | 363/49 |
| 2004/0135622 A1* | 7/2004 | Masleid et al. | 327/540 |
| 2005/0184706 A1* | 8/2005 | Tsai | 320/166 |
| 2008/0106239 A1* | 5/2008 | Cegnar | 320/167 |
| 2008/0143301 A1* | 6/2008 | Bartilson | 320/167 |
| 2009/0009145 A1* | 1/2009 | Odajima et al. | 320/166 |

* cited by examiner

*Primary Examiner* — Arun Williams
(74) *Attorney, Agent, or Firm* — Morris, Manning & Martin, LLP; John R. Harris

(57) ABSTRACT

Systems and methods are provided for charging a super capacitor bank. One method provides for determining a charge voltage for the super capacitor bank, providing a charging current, limiting the charging current according to a corresponding worst case temperature within the super capacitor bank operating temperature range, limiting the charge voltage according to the worst case temperature, and turning off the charging current once the super capacitor bank is charged. One system provides a super capacitor bank for storing energy providing specified power demand to a circuit, a current charger providing charging current to the super capacitor bank, the charging current limited in accordance with a corresponding worst case temperature within the super capacitor bank operating temperature range, a voltage sense circuit to detect the super capacitor bank voltage, and a control to disconnect the current charger from the super capacitor bank once the super capacitor bank is charged.

23 Claims, 2 Drawing Sheets

APPARATUS AND METHOD FOR CHARGING SUPER CAPACITORS AT LIMITED VOLTAGE AND/OR CURRENT VALUES IRRESPECTIVE OF TEMPERATURE

CROSS-REFERENCE TO RELATED APPLICATIONS

This application claims the benefit under 35 U.S.C. §119 (e) of U.S. Provisional Patent Application Ser. No. 60/943,135, entitled "Systems and Methods for Charging Super Capacitors," filed Jun. 11, 2007, which is incorporated herein by reference as if set forth herein in its entirety.

TECHNICAL FIELD

The present invention relates generally to charging super capacitors, and more particularly to charging super capacitor banks irrespective of temperature effects on the voltage ratings of the capacitors.

BACKGROUND

Super capacitors are typically used as a power reservoir to supply temporary reserve power when available input power is unable to handle a spike in power demand or when the input power supply is no longer available due to a power failure. Super capacitors provide reserve power, for example, for a telemetry device when enabling a temporary boost in transmission power, or when enabling a "last gasp" transmission opportunity in the event of power failure.

The maximum charging voltage for super capacitors is a function of the operating temperature. As the operating temperature is increased, the maximum voltage rating of the super capacitor is reduced. Since exceeding the maximum charging voltage reduces the life of the super capacitor, temperature compensating circuits are often used to limit the charging voltage at higher operating temperatures.

SUMMARY

The present invention provides systems and methods for charging a super capacitor bank. In one embodiment, a method for charging a super capacitor bank comprises determining a desired charge voltage for the super capacitor bank, providing a charging current to the super capacitor bank, limiting the charging current according to a corresponding worst case temperature within the super capacitor bank operating temperature range, limiting the charge voltage according to the worst case temperature within the super capacitor bank operating temperature range, and turning off the charging current upon a determination that the super capacitor bank has been charged to the desired charge voltage.

Another method for charging a super capacitor bank comprises determining a charging current limit for the super capacitor bank, wherein the charging current limit is the maximum charging current for the super capacitor bank at worst case temperature within the super capacitor bank operating temperature range, determining a charging voltage limit for the super capacitor bank, wherein the charging voltage limit is the maximum voltage for the super capacitor bank at worst case temperature within the super capacitor bank operating temperature range, providing a charging current to the super capacitor bank, wherein the charging current is less than the charging current limit, maintaining the charging voltage below the charging voltage limit, and turning off the charging current upon determining that the super capacitor bank has charged to a specified charge voltage.

In another embodiment, a method for charging a super capacitor bank comprises providing a regulated voltage, where the regulated voltage is the maximum voltage for the super capacitor bank at worst case temperature within the super capacitor bank operating temperature range, providing a charging current to the super capacitor bank, and limiting the charging current below a specified maximum charging current specified for the super capacitor bank according to worst case temperature within the super capacitor bank operating temperature range.

In another embodiment, a method for charging a super capacitor bank comprises determining a charging current limit for the super capacitor bank where the charging current limit is the maximum charging current for the super capacitor bank at worst case temperature within the super capacitor bank operating temperature range, providing a regulated voltage where the regulated voltage is the maximum voltage for the super capacitor bank at worst case temperature within the super capacitor bank operating temperature range, and providing a charging current to the super capacitor bank where the charging current is less than the charging current limit.

In yet another embodiment, a system for charging a super capacitor bank comprises a super capacitor bank for storing energy and to further provide a specified power demand to a circuit, a current charger to provide a charging current to the super capacitor bank, where the charging current is limited to a maximum charging current corresponding to a worst case temperature within the super capacitor bank operating temperature range, a voltage sense circuit to detect the voltage of the super capacitor bank, and a control configured to disconnect the current charger from the super capacitor bank upon detecting a specified voltage at the super capacitor bank.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is now made in detail to the description of the embodiments of systems and methods for charging super capacitor banks as illustrated in the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
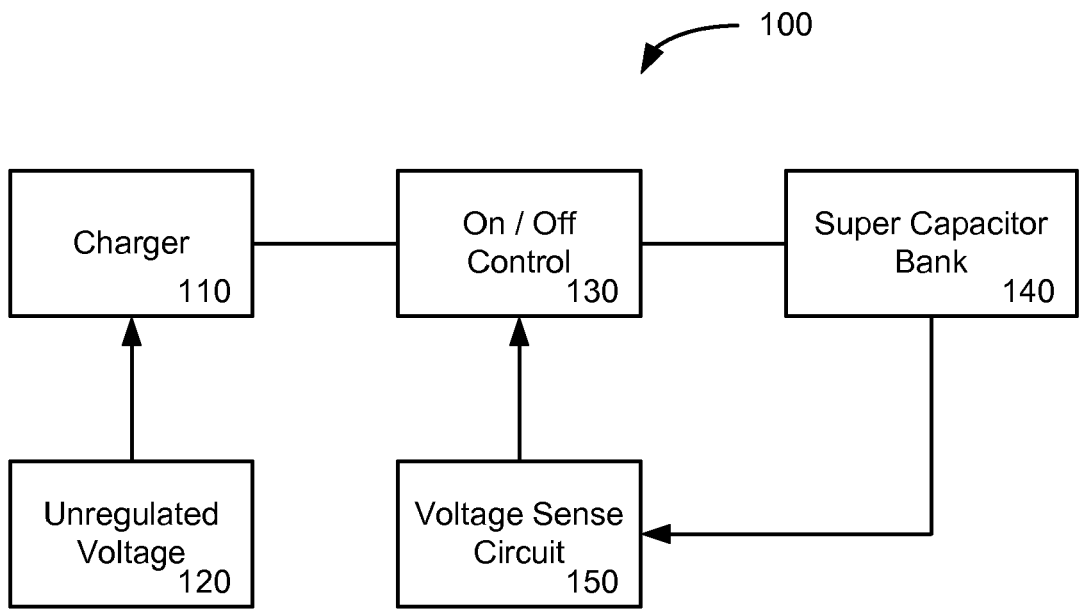
FIG. 1 is a block diagram illustrating a system for charging a super capacitor bank irrespective of temperature effects on the voltage ratings of the capacitors.

FIG. 1 is a block diagram illustrating an embodiment of a system 100 for charging a super capacitor bank 140 irrespective of temperature effects on the voltage ratings of the capacitors. A charger 110 provides current from an unregulated voltage 120 for charging the super capacitor bank 140. The charging current and voltage are maintained at a level that is safe for the range of operating conditions based on the super capacitor characteristics as provided by the super capacitor manufacturer. A voltage sense circuit 150 is provided for monitoring or detecting the voltage level of the super capacitor bank. When the super capacitor bank 140 is charged to the desired voltage, the voltage sense circuit 150 provides an input that signals the on/off control 130 to disconnect the charging current from the charger 110.

Additionally, when the super capacitor bank 140 voltage drops below the desired voltage level, the voltage sense circuit 150 provides an input that signal the on/off control 130 to connect the charging current from the charger 110. The super capacitor bank 140 begins charging again.

One skilled in the art will readily note that the charger 110 need not be limited to a constant current charge, so long as the charging current does not exceed the maximum recommended charging current for the super capacitors, and the charge time does not exceed the maximum allowable charge time for the application.

Super capacitors are typically used as a power reservoir to supply temporary reserve power for circumstances when available input power is unable to handle a spike in power demand, or other relatively sudden increases in power demand, or when the input power supply is no longer available due to a power failure. In one non-limiting example, super capacitors provide reserve power for a telemetry device when enabling a temporary boost in transmission power. In another example, super capacitors provide reserve power when enabling a "last gasp" transmission opportunity in the event of power failure. Such "last gasp transmissions" allow for notification to a server or other system devices that the application or device may not be available, for example.

Super capacitors are charged to a temperature-dependent maximum voltage. Exceeding the maximum charge voltage typically reduces the life of a super capacitor. Super capacitors are typically sized to supply adequate energy to, for example, a communication module, under worst case conditions. Worst case conditions typically occur near the high end of the operating temperature range (typically 85 degrees Celsius).

Charging circuits typically protect components from overheating by varying the charging voltage with temperature. The charging voltage is allowed to track, but not to exceed, the maximum working voltage at any given temperature. Necessarily then, a circuit for adjusting the charging voltage according to temperature increases cost as well as printed circuit board (PCB) space requirements. It should be noted that embodiments of the present invention simplify the circuitry for charging super capacitor banks according to worst case voltage requirements while also extending the life of the super capacitors. Even so, functionality is not sacrificed.

The energy storage capacity of the super capacitor bank 140 is given by:

$$E = \frac{1}{2}CV^2$$

E is the stored energy (joules), C is the capacitance (farads) of the super capacitor bank 140, and V is the voltage (volts) across the super capacitor bank 140. An increase in temperature reduces the maximum voltage rating of the super capacitor. Thus, the energy storage capacity of the super capacitor is lower at high temperatures. The energy capacity and voltage rating of the super capacitors are configured such that even with the reduced voltage at high temperatures, e.g., 85 degrees Celsius, adequate energy is stored and available for the particular application(s). The extra energy that is available at lower temperatures is not used or needed. The super capacitor bank 140 is charged for the worst case voltage irrespective of temperature, and thus, temperature compensated charging mechanisms are not necessary.

In one exemplary embodiment, a product is designed for a circuit to operate in a temperature range from −40 degrees C. to +85 degrees C., where the super capacitors have a maximum voltage rating of 2 V at +85 degrees C. and a maximum voltage rating of 2.5 V at −40 degrees C. The super capacitors are charged to 2 V throughout the temperature range, even though they have the capacity for charging to 2.5 V at −40 degrees C. The functionality of the circuit is not reduced because even with a temperature compensated charging circuit, the load calculations would be based on a worst case voltage of 2 V. Such load calculations would not utilize the extra charge that would be available at higher voltages.

In an exemplary embodiment, a worst case voltage rating for the super capacitors of 2 V at 85 degrees Celsius, would necessitate the charging voltage being maintained at or below 2 V irrespective of the actual temperature. Similarly, a maximum safe charging current of 1 A under worst case conditions would necessitate maintaining the current at or below 1 A irrespective of the actual temperature conditions.

Additional benefits provided by the system 100 of FIG. 1 include elimination of temperature compensated charging circuitry and the associated costs. Further, the circuit is typically smaller and therefore occupies less PCB space. The reduction of voltage stress on the super capacitors results in increased life, since the super capacitors are typically required to operate at maximum charge voltage conditions only at 85 degrees C. At temperatures below 85 degrees C., the super capacitors operate below their maximum charge voltage conditions. It should also be noted that reduced super capacitor voltage results in less heat dissipation in downstream linear voltage regulators.

Figure 2:
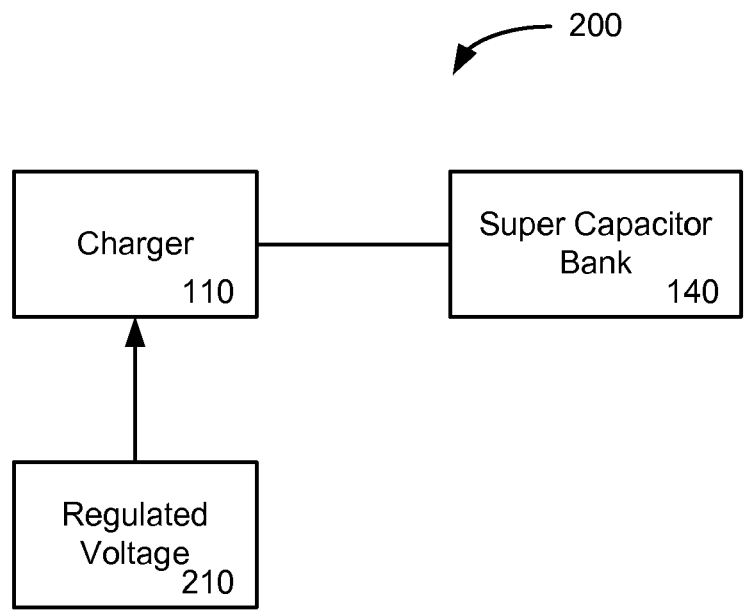
FIG. 2 is a block diagram illustrating an alternative system for charging a super capacitor bank using a regulated voltage.

FIG. 2 is a block diagram illustrating an alternate embodiment of a system 200 for charging a super capacitor bank 140 using a regulated voltage 210. Again, the super capacitor bank 140 is charged irrespective of temperature effects on the voltage ratings of the capacitors. The regulated voltage 210 provides the correct voltage as an input to the charger 110. A voltage regulator (providing regulated voltage 210) implements the control functionality, thus eliminating the need for an on/off control. The regulated voltage 210 corresponds to the maximum voltage rating of the super capacitors at the highest operating temperature. The charger 110 suffices for charging the super capacitor bank 140, so long as a regulated voltage 210 is supplied.

In one exemplary embodiment, the regulated voltage 210 provides the correct charging voltage, for the super capacitor bank 140, as the input voltage to the charger 110. The voltage regulator effectively implements the voltage control function, thus eliminating the need for an external voltage sensing circuit and an on/off controller.

The embodiment of FIG. 2 is used, for example, in intelligent devices that have a regulated switching power supply feeding the charging circuit for the super capacitors.

Figure 3:
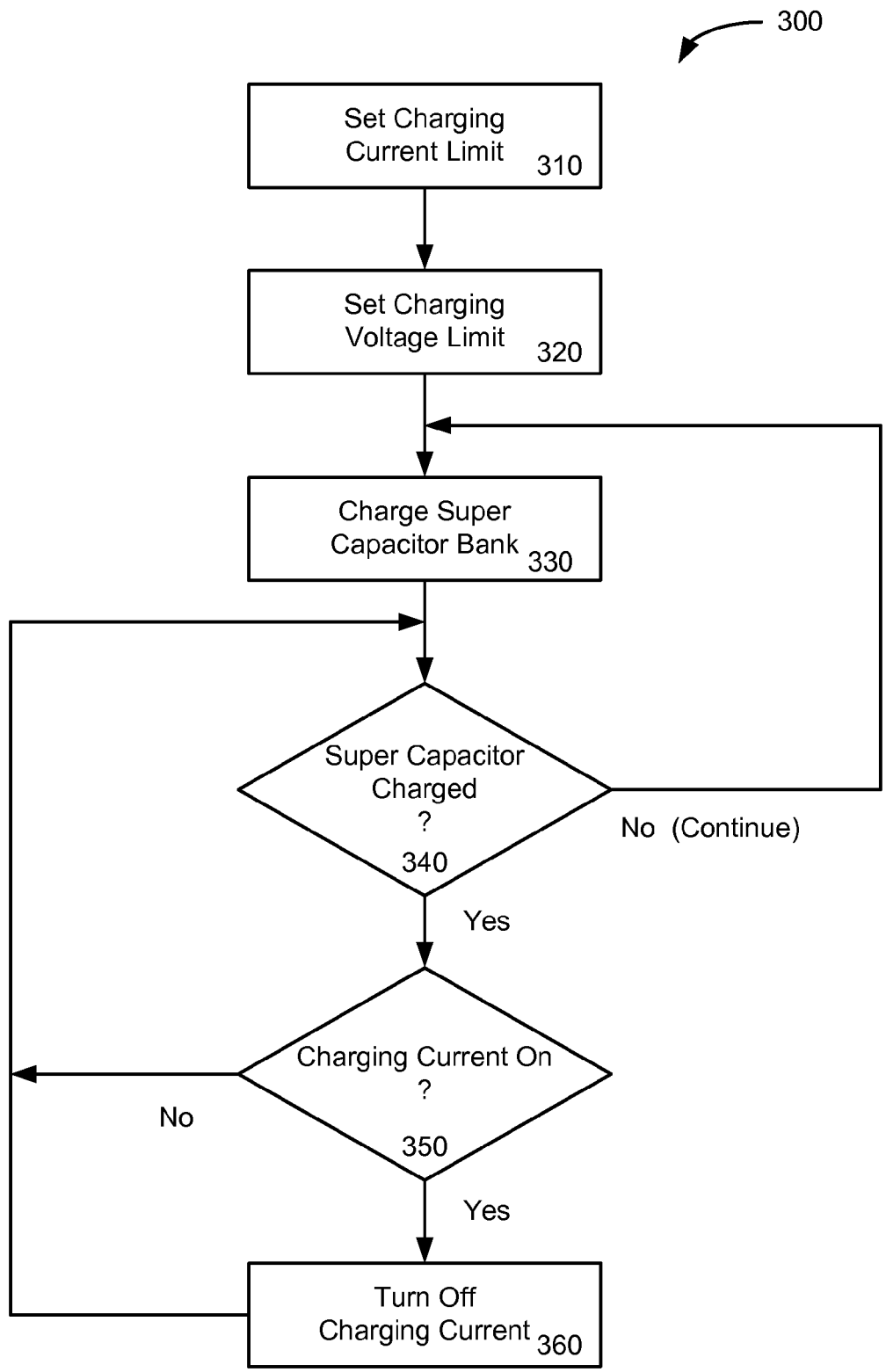
FIG. 3 is a flowchart illustrating a method for charging a super capacitor bank according to the system of FIG. 1.

FIG. 3 is a flowchart illustrating a method 300 for charging a super capacitor bank 140. In step 310, a charging current limit is set for the super capacitor bank 140. The charging current limit is the maximum charging current for the super capacitor bank 140 under worst case temperature conditions within the operating temperature range. In step 320, a charging voltage limit is set for the super capacitor bank 140. The charging voltage limit is the maximum voltage for the super capacitor bank 140 under worst case temperature conditions within the operating temperature range. The charging current is turned on and, limited by the charging current limit, is provided to the super capacitor bank 140 at step 330. The charging voltage is maintained below the charging voltage limit. In step 340, if the super capacitor bank 140 has not yet been charged to the desired voltage, the charging continues. Once the super capacitor bank has been charged to the desired voltage, the charging current is turned off at step 360.

Additionally, monitoring of the super capacitor bank 140 voltage continues after the super capacitors have achieved the desired voltage. After the super capacitor bank 140 has been charged to the desired voltage during step 340, a test is made to determine whether the charging current is still turned on at step 350. If the charging current is on at this point, then it is turned off at step 360 as above. If the charging current is off, then the method loops back to check the super capacitor bank 140 voltage at step 340. So long as the voltage remains at the desired level, this loop continues. If the super capacitor bank 140 voltage drops below the desired level due to usage or other leakage, for example, if the super capacitor bank has dropped a specified percentage below a desired charge level or dropped a specified percentage below a specified charge voltage, then the functionality of block 330 is activated to turn on the charging current and charge the super capacitor bank 140. In addition to charging the super capacitor bank 140, the voltage of the super capacitor bank 140 is also monitored for loss or leakage so that the super capacitor bank 140 is charged when the voltage drops below a desired level.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for charging a super capacitor bank without monitoring of a operating temperature of the super capacitor bank, the method comprising:

providing a super capacitor charging circuit having a presettable charging voltage limit and a presettable charging current limit;

setting the presettable charging voltage limit to a predetermined charging voltage level less than the maximum level associated with the worst case temperature within the super capacitor bank operating temperature range;

setting the presettable charging current limit to a predetermined charging current level less than the maximum level associated with the worst case temperature within the super capacitor bank operating temperature range;

providing a charging voltage and current to the super capacitor bank via the super capacitor charging circuit;

limiting the charging current from the charging circuit to the predetermined charging current level during the charging;

limiting the charging voltage from the charging circuit to the predetermined charging voltage level during the charging;

sensing the charge voltage of the super capacitor bank; and turning off the charging voltage and current in response to a determination via the sensing step that the super capacitor bank has been charged to a desired charge voltage, whereby the super capacitor bank is charged at the limited charging voltage and limited charging current irrespective of operating temperature and without varying the charging with temperature.

2. The method of claim 1, further comprising turning on the charging voltage and current upon a determination that the super capacitor bank charge voltage has dropped a specified percentage below the desired charge voltage.

3. The method of claim 1, further comprising:

maintaining the charging current below a specified maximum charging current for the super capacitor bank; and limiting a charge time below a corresponding maximum allowable charge time for the super capacitor bank.

4. The method of claim 1, further comprising maintaining the charging current at a constant value.

5. The method of claim 1, wherein energy capacity and voltage rating of the super capacitor bank are configured to store energy sufficient for a specified application.

6. A method for charging a super capacitor bank without monitoring of a operating temperature of the super capacitor bank, the method comprising:

providing a super capacitor charging circuit having a presettable charging voltage limit and a presettable charging current limit and that is operative to provide a constant voltage and a constant current that does not exceed the preset charging voltage limit or the preset charging current limit;

setting the preset charging current limit for the charging circuit at a predetermined level corresponding to the maximum charging current for the super capacitor bank at worst case temperature within the super capacitor bank operating temperature range;

setting the preset charging voltage limit for the charging circuit at a predetermined level corresponding to the maximum voltage for the super capacitor bank at worst case temperature within the super capacitor bank operating temperature range;

providing a charging current to the super capacitor bank via the charging circuit at a level, less than the charging current limit;

providing a charging voltage to the super capacitor bank via the charging circuit at a level less than the charging voltage limit;

sensing the charge voltage of the super capacitor bank; and turning off the charging current and charging voltage in response to determining via the sensing step that the super capacitor bank has charged to a specified charge voltage, whereby the super capacitor bank is charged at the constant voltage and current irrespective of operating temperature and without varying the charging voltage with temperature.

7. The method of claim 6, further comprising turning on the charging current upon a determination that the super capacitor bank charge voltage has dropped a specified percentage below the specified charge voltage.

8. The method of claim 6, further comprising limiting a charge time for the charging current, wherein the limited charge time is below a corresponding maximum allowable charge time for the super capacitor bank.

9. The method of claim 6, further comprising maintaining the charging current at a constant value.

10. The method of claim 6, wherein energy capacity and voltage rating of the super capacitor bank are configured to store energy sufficient for a specified application.

11. A method for charging a super capacitor bank, the method comprising:
providing a charging circuit that provides a regulated charging voltage, wherein the regulated charging voltage is preset not to exceed the maximum voltage for the super capacitor bank at worst case temperature within the super capacitor bank operating temperature range;
providing a charging current to the super capacitor bank via the charging circuit; and
limiting the charging current from the charging circuit to a predetermined level below a specified maximum charging current during provision of the charging current to the super capacitor bank, wherein the maximum charging current is specified not to exceed the current for the worst case temperature within the super capacitor bank operating temperature range,
whereby the super capacitor bank is charged by the charging circuit irrespective of operating temperature and without varying the charging voltage with temperature.

12. The method of claim 11, further comprising limiting a charge time for the charging current, wherein the limited charge time is below a corresponding maximum allowable charge time for the super capacitor bank.

13. The method of claim 11, further comprising maintaining the charging current at a constant value.

14. The method of claim 11, wherein energy capacity and voltage rating of the super capacitor bank are configured to store energy sufficient for a specified application.

15. A method for charging a super capacitor bank, the method comprising:
providing a super capacitor charging circuit having a presettable charging current limit and that is operative to provide a charging current that does not exceed a preset charging current limit and that provides a regulated voltage for charging the super capacitor bank;
setting the preset charging current limit for the charging circuit at a predetermined level corresponding to a maximum charging current for the super capacitor bank at worst case temperature within the super capacitor bank operating temperature range; and
providing the regulated voltage from the charging circuit to charge the super capacitor bank at a preset voltage that does not exceed a maximum voltage for the super capacitor bank at worst case temperature within the super capacitor bank operating temperature range;
whereby the charging circuit provides the charging current to the super capacitor bank at a level less than the charging current limit via the regulated voltage irrespective of a operating temperature of the super capacitor bank.

16. The method of claim 15, further comprising limiting a charge time for the charging current, wherein the charge time is below a corresponding maximum allowable charge time for the super capacitor bank.

17. The method of claim 15, further comprising maintaining the charging current at a constant value.

18. The method of claim 15, wherein energy capacity and voltage rating of the super capacitor bank are configured to store energy sufficient for a specified application.

19. A system for charging a super capacitor bank without monitoring of a operating temperature of the super capacitor bank, the system comprising:
a super capacitor bank configured for storing energy, the super capacitor bank further configured to provide a specified power demand to a circuit;
a current charger operative to provide a charging current to the super capacitor bank, the current charger having a preset charging current limited to a maximum charging current corresponding to a worst case temperature within the super capacitor bank operating temperature range wherein the charging current to the super capacitor bank is less than the preset charging current limit;
a voltage sense circuit operative to detect the voltage of the super capacitor bank during charging by the current charger; and
a control configured to disconnect the current charger from the super capacitor bank upon the voltage sense circuit detecting a specified voltage at the super capacitor bank whereby the super capacitor bank is charged by the charging current irrespective of the operating temperature and without varying the charging current with temperature.

20. The system of claim 19, wherein the control is further operative to connect the current charger to the super capacitor bank upon the voltage sense circuit detecting that the voltage at the super capacitor bank has dropped a specified percentage below the specified voltage.

21. The system of claim 19, further comprising a charge time limiter configured for limiting maximum allowable charge time for the super capacitor bank to a specified value.

22. The system of claim 19, wherein the current charger is further configured to maintain the charging current at a constant value.

23. The system of claim 19, wherein energy capacity and voltage rating of the super capacitor bank are configured to store energy sufficient for a specified application.

* * * * *